United States Patent [19]

Zulian

[11] Patent Number: 4,862,462
[45] Date of Patent: Aug. 29, 1989

[54] MEMORY SYSTEMS AND RELATED ERROR DETECTION AND CORRECTION APPARATUS

[75] Inventor: Ferruccio Zulian, Cornaredo, Italy

[73] Assignee: Honeywell Bull Italia S.p.A., Caluso, Italy

[21] Appl. No.: 132,842

[22] Filed: Dec. 14, 1987

[30] Foreign Application Priority Data

Feb. 12, 1987 [IT] Italy ................................ 19353A/87

[51] Int. Cl.[4] ............................................. G06F 11/10
[52] U.S. Cl. ................................................... 371/38
[58] Field of Search .............................. 371/38, 39, 40

[56] References Cited

U.S. PATENT DOCUMENTS 3,814,921 6/1974 Nibby et al. ........................... 371/38
4,058,851 11/1977 Scheuneman ....................... 364/900
4,646,304 2/1987 Fossati et al. ......................... 371/38

Primary Examiner—Charles E. Atkinson
Attorney, Agent, or Firm—J. H. Phillips; J. S. Solakian

[57] ABSTRACT

Memory system and related error detection and correction apparatus wherein the memory, independently on its parallelism, is organized in modules having single byte parallelism, each module having a section with a plurality of bit parallelism for storing SEC-DED codes related to the information stored in the module and wherein a fast memory, addressed with the information codes and the related SEC-DED codes read out from a memory module produces an information output code, corrected as a function of the SEC-DED code, a parity check bit for the corrected information code, and further bits indicative of a corrected single error and a multiple error which cannot be corrected.

4 Claims, 2 Drawing Sheets

MEMORY SYSTEMS AND RELATED ERROR DETECTION AND CORRECTION APPARATUS

BACKGROUND OF THE INVENTION

The present invention relates to a memory system and related error detection and correction apparatus.

It is known that in current data processing systems semiconductor working memories are used having larger and larger capacity and higher and higher integration. Memory integrated circuits having 1M bit capacity have been available which enable the implementation of working memories having capacities ranging from 1M byte to several tens of M bytes, requiring the use of a limited number of integrated circuit components.

There exists a fundamental problem for such memories; namely, to assure the correctness of the data stored into and read out from memory. At this component integration level and with so large a memory capacity, it becomes very probable that some elementary storage cells of the memory system are or become temporarily defective. To overcome this defective condition, error detection and correction apparatuses are broadly used.

Basically, a corresponding code is stored in memory together with each stored information. Such code enables the correction of a single error and in some cases, to detect or correct double errors.

Such error correcting codes are generally referred to as SEC-DED codes, and require the storage into memory of an additional number of bits which is a function of the number of bits composing the information and the resolution capacity of the error code.

For a single byte of information comprising 8 bits, an error correcting code capable of correcting a single error and of detecting a double error requires the use of 5 additional bits. For 2 bytes of information, the SEC-DED code must comprise 6 bits and for 4 bytes of information the SEC-DED code must have 7 bits. Therefore, the higher the memory parallelism is, the lesser, percentage-wise, the memory capacity increment required to store the error codes.

Although perhaps not the sole reason, it is certainly a contributing factor to the design of memories having higher and higher parallelism, i.e., 16, 32 and 64 bits, which trades off against other factors.

A trade off consists of the fact that if it is desired to address and modify a single memory byte, each write operation of a single byte requires a complicated read operation of the whole word containing the byte and the writing of a new word containing the modified byte as well as the corresponding SEC-DEC code which must be constructed based on the whole word length.

Another trade off consists of the fact that the check operation and possible correction of the information read out from memory, requires a certain time which adds to the read operation time and which is greater the higher memory parallelism.

In practice, the checking and correcting portion of the information read out requires regeneration by means of a logical network generally comprising several stages of exclusive OR (EX-OR) circuits, a SEC-DEC code related to the information as read out from memory, and a comparison of such code with the corresponding SEC-DED code read out from memory. The comparison, performed in a comparing network, enables the generation of an error syndrome. An error correction logic receives as input the information read as well as the error syndrome, and provides as output the corrected information. Such an operation must be performed in time sequence and requires a predetermined time.

Today, EDAC integrated circuits are available on the market. An example is the integrated circuit AM 2960 manufactured by Advanced Micro Division (AMD), Sunnyvale, Calif. which performs the above mentioned function over a 16 bits parallelism and which may be interconnected to operate with any parallelism equal to or in multiples of 16 bits. Such components, which are very expensive, overcome the problem of the circuit complexity for the error correction circuits, but do not overcome the problem of the time spent for the check operation, which is in the range of 50–60 nsec., against a memory read cycle time in the order of 100–200 nsec. In addition, the above indicated check time of 50–60 nsec is the internal time required by the integrated circuit and can increase to more than 100 nsec when the delays are considered which are introduced by the interconnection and control circuits which connect the EDAC circuits with memory on one side and a system bus on the other side, thereby permitting communication between memory and the other units, such as a central processing unit.

A further reason for complication and delay is due to the fact that the corrected information which is output from the EDAC circuit, and transferred on the communication bus, is accompanied by a parity check bit for data integrity purpose. This control bit assures that the corrected information produced by the memory system is not affected by error in the transfer process on the communication bus up to the receiving unit, e.g., the central unit of the data processing system. Therefore the memory system is provided with a parity check bit generation network cascaded with the other circuit elements, which necessarily causes further delay in the effective availability of the information, or as a minimum, of the check bit, if a bypass is provided.

These disadvantages are overcome by the memory system and related error detection and correction apparatus which is the object of the present invention and where the memory is organized with a parallelism of multiple bytes, each byte being individually addressable and being provided with a related SEC-DED code.

Each byte read out, together with its related SEC-DED code, is used as address for a fast memory of reduced capacity, which implicitly, the same as a Pythagorean table performs a multiply operation; namely, performs the operations of SEC-DED code regeneration, comparison with the SEC-DED code read out from memory, generation of the error syndrome, correction of the possible error and generation of the parity check bit. All these operations are simultaneously performed in the time required to read the fast memory at byte level, and for a working memory having a parallelism multiple of one byte, as many "EDAC" fast memories are provided as are the bytes composing the word read out from memory.

In this way each byte may be handled, checked, corrected, independently from the others and all the procedural complexities and time-inefficiencies related to read-modify-write operations required for the writing of a single byte in a multiple byte parallelism working memory are avoided.

The same concept may be used to perform the information checking against the related parity check bit and the generation of the SEC-DED code to be written into memory. These operations may be performed by a small capacity, fast memory or by the same fast memory which is used as EDAC circuit. Read Only Memories as well as Read Write memories may be used for this purpose and therefore the developments offered by the technology in terms of speed and cost for both memory types may be fully exploited. The remarkable advantages which are achieved, fully justify the greater capacity required to the working memory, which, in case of 4 byte parallelism requires an overall parallelism of 32+20 bits against the 32+7 bits of a conventional memory system.

SUMMARY OF THE INVENTION

Therefore, there is supplied, a memory system including error detection and correction apparatus which comprises a memory module, having address inputs and data inputs, for storing at each memory address a first (information) binary code and a second (error detection and correction) binary code related to the information. The first and second binary codes are provided as input to the memory module. The memory module further has data outputs to read out, from the memory module at each address, a third and fourth binary code, which in absence of a memory error coincide with the first and second binary code, respectively. A fast memory is included which has address inputs connected to the data outputs of the memory module and further has read-out outputs. The fast memory contains an information set such that for each address defined by the third and fourth binary code there is a corresponding fifth and a sixth binary code output of the read-out outputs. The fifth code is coincident with the first code in the absence of a memory error or in the presence of a correctable error, and the sixth code is indicative of the absence of an error, or the presence of a correctable error in the third code, or of the presence of errors which cannot be corrected.

Accordingly, it is an object of the present invention to provide a memory system organized with a parallelism of multiple bytes.

It is another object of the present invention to provide a memory system organized with a parallelism of multiple bytes, each byte being individually addressable.

It is still another object of the present invention to provide a memory system organized with a parallelism of multiple bytes, each byte being individually addressable and provided with a related code.

These and other objects of the present invention will become more apparent when taken in conjunction with the following description and attached drawings, wherein like characters indicate like parts, and which drawings form a part of the present application.

DETAILED DESCRIPTION

Figure 1:
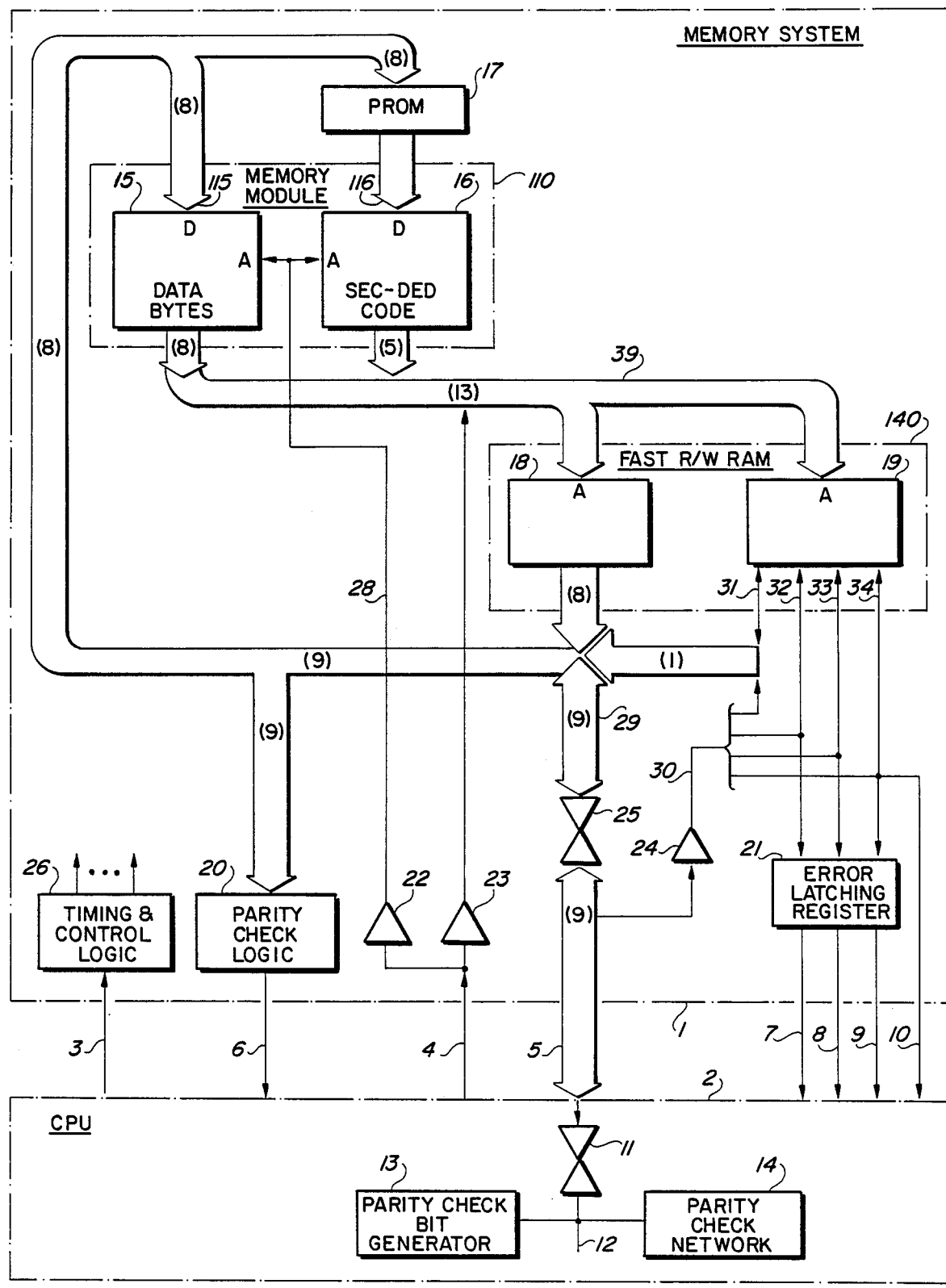
FIG. 1 shows in block diagram a first preferred form of embodiment for a memory system according to the invention.

Referring to FIG. 1, there is shown a preferred embodiment of a memory system and related error detection and correction apparatus.

Block 1 is the memory system and block 2 shows a generical central unit, or CPU, which communicates with the memory system through a bus comprising a plurality of lead sets 3-10. A lead set 3 constitutes a channel for sending commands to the memory system, such as memory read/write commands, or commands for writing/reading preestablished memory registers 26, for instance diagnostic and status registers.

A lead set 4 constitutes an address channel, for sending addresses to the memory system. By way of example, the memory may have a capacity of 1M addressable locations and requires an addressing channel of 20 leads.

A lead set 5 constitutes a bidirectional data channel for sending or receiving data from memory. In the preferred embodiment shown in FIG. 1, channel 5, also referred to as lead set 5, comprises 9 leads, 8 of which are used for a byte transfer and the remaining lead for the transfer of a parity check bit. A set of leads, 6, 7, 8, 9, 10 connects memory 1 and CPU 2 for sending suitable error signals to CPU 2.

Specifically, lead 6 is used to transfer to CPU 2 a parity error signal to indicate that information received from CPU 2, through channel 5 and intended for writing into memory, contains a parity error. Usually the generation of this signal in memory 1 inhibits the performing of the write operation. Lead 7 is used to transfer to CPU 2 a single error signal, to indicate that during a memory read operation the memory system has detected a single error in the data and by using the error correcting code it has been able to correct such error. Lead 8 is used to transfer to CPU 2 a multiple non-correctable error signal, to indicate that the memory system has detected at least a double error that cannot be corrected. Lead 9 is used to transfer to CPU 2 an error signal to indicate that an error has been detected in the control bits, but no error is present on the data read out, which is correct.

Channel 5 is connected, through a set of bidirectional tristate gates 11, to an internal CPU channel 12. A parity check bit generator 13 and a parity check network 14, both conventional, are connected to channel 12. Generator 13 associates a parity check bit to the data present on channel 12. The data and the related check bit are transferred on channel 5 through gates 11. Parity check network 14 regenerates, based on data received through gates 11, the corresponding parity check bit and compares it with the parity bit present on channel 12, to check the integrity of the received data.

The memory system comprises a memory module 110 conceptually divided in two sections 15, 16, a programmable read only memory (PROM) 17, a fast read/write memory 140, conceptually divided in two sections 18, 19, a parity check logic 20, an error latching register 21, sets of unidirectional tristate receivers 22,23,24, a set of bidirectional tristate gates 25 and a conventional timing and control logic 26 for generating, as a function of the commands received through the bus, the timed control signals required for the operation of the memory system.

The memory module 110 is comprised of a section 15 having 8 bit parallelism for the storing of data bytes and of a section 16 having 5 bit parallelism, for the storing of a SEC-DED code related to each stored data, in the same memory location, that is at the same module address.

Address channel 4 is connected, through the tristate receivers 22 and internal address channel 28 to the address inputs of the memory module 110.

Data channel 5 of the system bus is connected through bidirectional tristate gates 25 and channel 29 to the data inputs 115 of section 15 and to the address inputs of PROM 17, whose outputs are connected to the data inputs 116 of section 16 of the memory module. The data inputs 115 of section 15 form a first subset of the memory module inputs, and data inputs 116 of section 16 form a second subset of the memory module inputs.

Parity check logic 20 has inputs connected to channel 29 and the output connected, to lead 6, if required through a driver, which is not shown.

The outputs of memory module 110, having 13 bit parallelism, are connected to the address inputs of a fast memory 140 through channel 39. Such memory preferably consists of three integrated circuits, marketed by firm HITACHI with code HM6788-30. Each of the integrated circuits has a capacity of $16 K \times 4$ bits and a maximum access time of 30 nsec. These integrated circuits are read/write memories with pins which performs as input for write operations and output for read operations.

Section 18 comprises two integrated circuits, and has a parallelism of 8 bits, while section 19 comprises one integrated circuit only and has 4 bit parallelism. The data input/output pins of section 18 are connected to channel 29 and more precisely to the 8 data leads of channel 29.

The input/output data pins of section 19 are connected to a channel 30 along with the output from tristate drivers 24, the tristate drivers 24 having their input connected to channel 5. A data pin 31 of section 19 is further connected to parity check lead of channel 29. The remaining pins 32, 33, 34 are connected to inputs of register 21, whose outputs are connected to the bus leads 7, 8, 9, respectively. Pin 34 is further connected to lead 10.

The tristate drivers 23 have their inputs connected to channel 4 and the outputs connected to channel 39. By means of the described connections and through suitable commands generated by timing an control logic 26 it is possible to load the fast memory 140 with suitable information.

In particular, section 18 of fast memory may be addressed from bus, through drivers 23, enabled, and channel 39 and controlled for write operation at subsequent addresses. The information to be stored is received by section 18 through channel 5, bidirectional tristates 25 and channel 29. Likewise section 19 may be addressed through enabled drivers 23 and channel 29, and the information to be stored is received through tristates 24 and channel 30.

Each address of the fast memory may be conceived of as a 13 bit information representing an 8 bit data and a 5 bit SEC-DED code which defines if the 8 bit data is correct, affected by single error, identified by the related SEC-DED code, or affected by multiple error, or eventually correct while the related SEC-DED code is error affected.

Correspondingly at each address of the fast memory it is possible to write an 8 bit data, possibly correct, in section 18 and in section 19 it is possible to write a 4 bit information, each of the bits having respectively the following meaning:

Bit available at output 31: parity check bit for the related data written in section 18. In case the data is affected by multiple error the check bit is inverted so as to provide an error indication.

Bit available at output 32: indicates that a single error has been detected and corrected.

Bit available at output 33: indicates that an error has been detected in the SEC-DED code.

Bit available at output 34: indicates that a multiple error has been detected, which cannot be corrected.

Once the fast memory 140 is loaded with this kind of information (the operation can be performed at system initialization) it is able to operate as an error detection and correction circuit for the memory module and in addition as parity generator with the peculiarity that in case of multiple error, the parity check bit is inverted so as to force an error status.

According to the same concept PROM 17 may be programmed so that at each 8 bit address code corresponds in output a 5 bit code representing the SEC-DED code related to the 8 bit address code. PROM 17 preferably consists in an integrated circuit, marketed by the firm Monolithic Memories with code 635281A, that is an integrated PROM having capacity of $256 \times 8$ bit and maximum access time of 28 nsec.

WRITE OPERATIONS

For a write operation CPU 2 puts on communication bus data to be written, accompanied by a parity check bit, generated by unit 13 (channel 5), a memory address (channel 4) and suitable commands for activation of a memory write (channel 3).

The address is inputted, via tristate drivers 22 to the memory module 110.

The data to be written, together with the related parity check bit is transferred via bidirectional tristates 25, on channel 29.

Parity check control logic 20 checks if the data on channel 29 is correct, that is it verifies that no error has been introduced in the transfer of the data from the CPU 2.

In case of error detection the memory write operation is aborted and an error signal is generated on lead 6. In case of no error, the data present on channel 29 is inputted to section 15 and to PROM 17. This generates an output from PROM 17 which is the SEC-DED code related to the data and provides such output to the input of section 16. The information is then stored into the memory module.

READ OPERATIONS

For read operations CPU 1 puts on communication bus a memory address (channel 4) and suitable commands for activation of a read operation (channel 3). The address is inputted, via tristate drivers 22, to the memory module (sections 15,16). The readout information becomes available on channel 39 and comprises an 8 bit code (data) and a 5 bit code (SEC-DED).

The information is used as address for fast memory 140 which is controlled for a read operation and provides (with a maximum delay of 30 nsec. in the preferred embodiment) output information. This information comprises an 8 bit code, which indicates whether the data read out from memory section 15, was correct, or whether the information was corrected if the data read out from section 15 was affected by single error.

In case the information read out from module 110 is affected by multiple, non-correctable error, the data output from section 18 of the fast memory 140 may be the same data read out from section 15 or an 8 bit code suitably preestablished as an error code. At the same time section 19 produces a set of output signals which describes the several possible cases.

At terminal 31 a parity check bit is available which is conveyed on channel 29 together with the data code read out from RAM 18. At terminals 32, 33, 34 signals are made available which, depending on circumstance, indicate a single error, error in the control bits or multiple error, respectively.

This set of information is loaded in register 21, which may be directly read through bus leads 7, 8, 9 or, if so preferred, by means of diagnostic commands, independently from the performed memory read operation. In such an alternative embodiment (not shown) the outputs of register 21 may be connected to channel 29 instead of leads 7, 8, 9.

In either embodiment, terminal 34 is connected to lead 10 of the bus, to deliver immediately to CPU 2 the multiple non-correctable error signal and to invalidate the data present on channel 29 and from there transferred, through tristates 25 and channel 5, to CPU 2.

Fast memory 140 constitutes therefore an effective and fast error detection and correction circuit for errors which may occur in memory module 110 or in PROM 17.

In addition it constitutes an effective parity check bit generation circuit having conceptually an infinite speed.

In fact the parity check bit for the corrected information output from the error detection and correction circuit is generated at the same time as the corrected information, with no delay.

In addition, the error detection and correction circuit is self diagnosing and protected against single error occurrence.

If the information input to fast memory 140 introduces an error in the output data, the parity check bit related to such information is not the proper one and parity check control networks 20 and 14 are able to detect and give signal of the presence of such error.

If both network 20 and 14 generate error signals, this indicates that the error has been generated upstream the communication path composed by tristates 25, channel 5 and tristate 11.

On the other hand, if by reading register 21 it results that no single error has been detected in memory module 110, the defective unit which has caused the error must be the fast memory 140.

The same concept is applicable if the error has been introduced in the parity check bit present at output 31. If information input to fast memory 140 is affected by single error, the fast memory 140 corrects such error. If the fast memory 140 causes a new error, the considerations already exposed are true, with the difference that register 21, once referenced, may show that in addition to the fast memory 140 being defective, there was also a single error in the data read out from memory module 110.

If the information read out from memory 110 is affected by multiple uncorrectable error, it is essential that even if fast memory 140 is defective an error indication be provided. In this case, if owing to malfunctioning of memory 140 the multiple error signal is not generated, there is at least a parity error signal available, which indicates the malfunctioning of memory 140. The integrity of data transferred from memory system 1 to CPU 2 is therefore assured in any case.

In case the malfunctioning of memory 140 is such as to cause a multiple error signal even in the absence of such multiple error, the malfunctioning is anyhow detected, because the parity check bit related to the information read out is correct and non inverted. The only cases of malfunctioning which are not detected by the system of FIG. 1, are those which causes a faulty indication of single error at the output 32 and a faulty indication of error in the SEC-DED code. These kinds of malfunctioning do not affect the data integrity.

The preferred embodiment of the memory system and related error detection and correction apparatus of FIG. 1 permits alternatives to be made within the scope of the present invention.

In order to provide better diagnostics, it is possible to increase the parallelism of section 19 to obtain a redundancy of the output information which assures the full recognition of memory 140 possibly malfunctioning as well as the bit identification, in addition to correction, of single errors which occurred in memory 110.

To this purpose a diagnostic register (not shown) may be provided which indicates the information output from memory module 110 and the SEC-DED code are to be saved. In case of a single error, signaled by fast memory 140, the reading of such diagnostic register and the processing of the information contained therein enables identifying the single error and the memory 110 component which has caused such error. The use of a read only memory for implementing the error detection and correction logic 140 allows simplifying the embodiment and avoiding the initialization of the memory.

Figure 2:
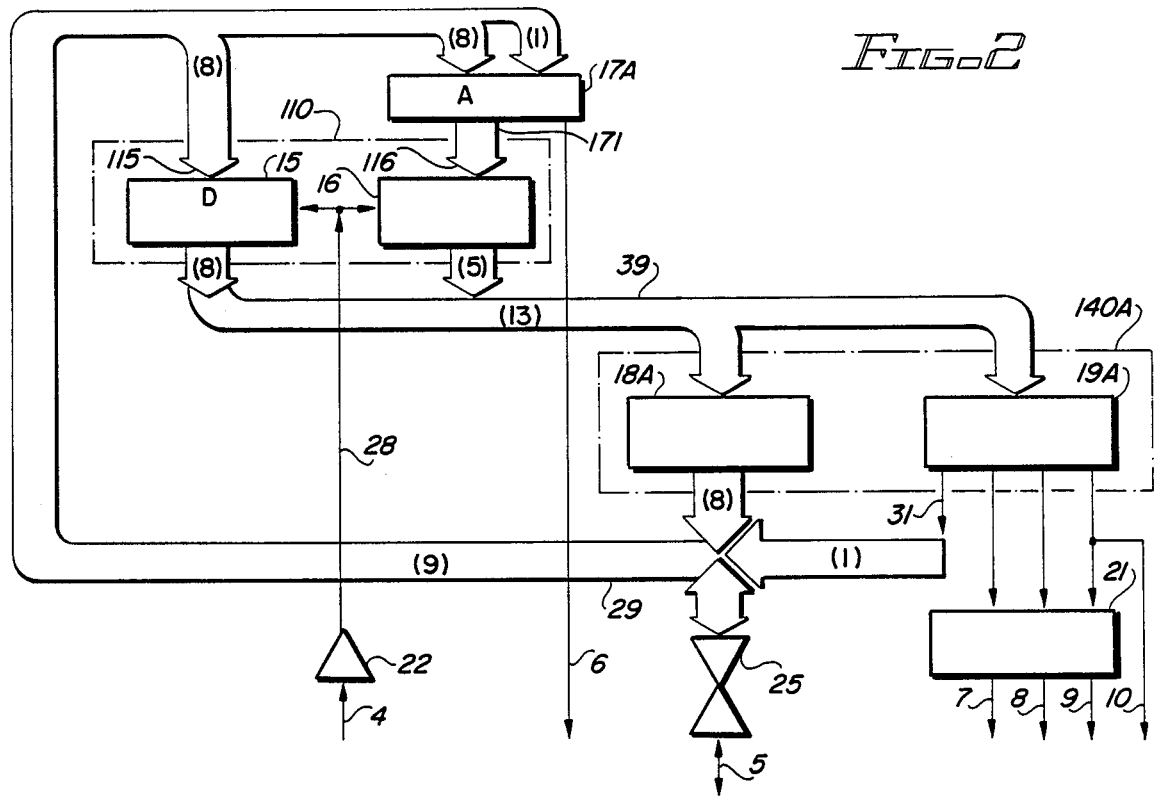
FIG. 2 shows in block diagram a second form of embodiment for a memory system according to the invention.

Referring to FIG. 2, there is shown a block diagram of a memory system and related error detection and correction apparatus where the EDAC is implemented in a PROM. Elements functionally equivalent to those of FIG. 1 are referenced with the same numeral.

The memory module 110 is addressed through channel 28, tristates 22 and bus channel 4. The data to be written into memory is received through channel 5, tristates 25, internal channel 29 and are inputted to data inputs of section 15 of module 110. They are further inputted, together with the related parity check bit to address inputs of a PROM 17A. Differently from PROM 17 of FIG. 1, PROM 17A in an alternative embodiment has a capacity of 512×8 bits and is for instance composed of the integrated circuit marketed by AMD (Am 27531A). This circuit has a maximum access time of 35 nsec. The PROM 17A is programmed to output, in addition to the SEC-DED code related to the information of the input, a parity error signal in case the information input is not consistent with the accompanying parity check bit. The additional second output 171 of PROM 17A corresponding to such signal is therefore connected to lead 6, while the 5 outputs, where the SEC-DED code is available, are connected to the data inputs 116 of section 16 of memory 110.

The 13 outputs of memory 110 are connected to the inputs of a high speed read only memory 140A. Memory 140 A may be implemented with integrated circuit PROMs having capacity of 8K×8 bit, manufactured by CYPRESS, IC number CY7C261. Such circuits have a maximum access time of 35 nsec. Memory 140 A, like memory 140 of FIG. 1 is organized in two sections 18A, 19A. The outputs of section 18A are connected to channel 29. The outputs of section 19A are connected, one to the parity check bit lead of channel 29, and the remaining three to inputs of the diagnostic register 21. The output on which the multiple error signal is possibly present is connected to lead 10.

The operation of the memory system and related error detection and correction apparatus is identical to the one described with reference to FIG. 1 except that the initialization writing of memory 140 is not required. In addition, the parity check function on data to be written is performed by PROM 17A. In other words, the parity control network 20 of FIG. 1 is integrated within PROM 17A.

Figure 3:
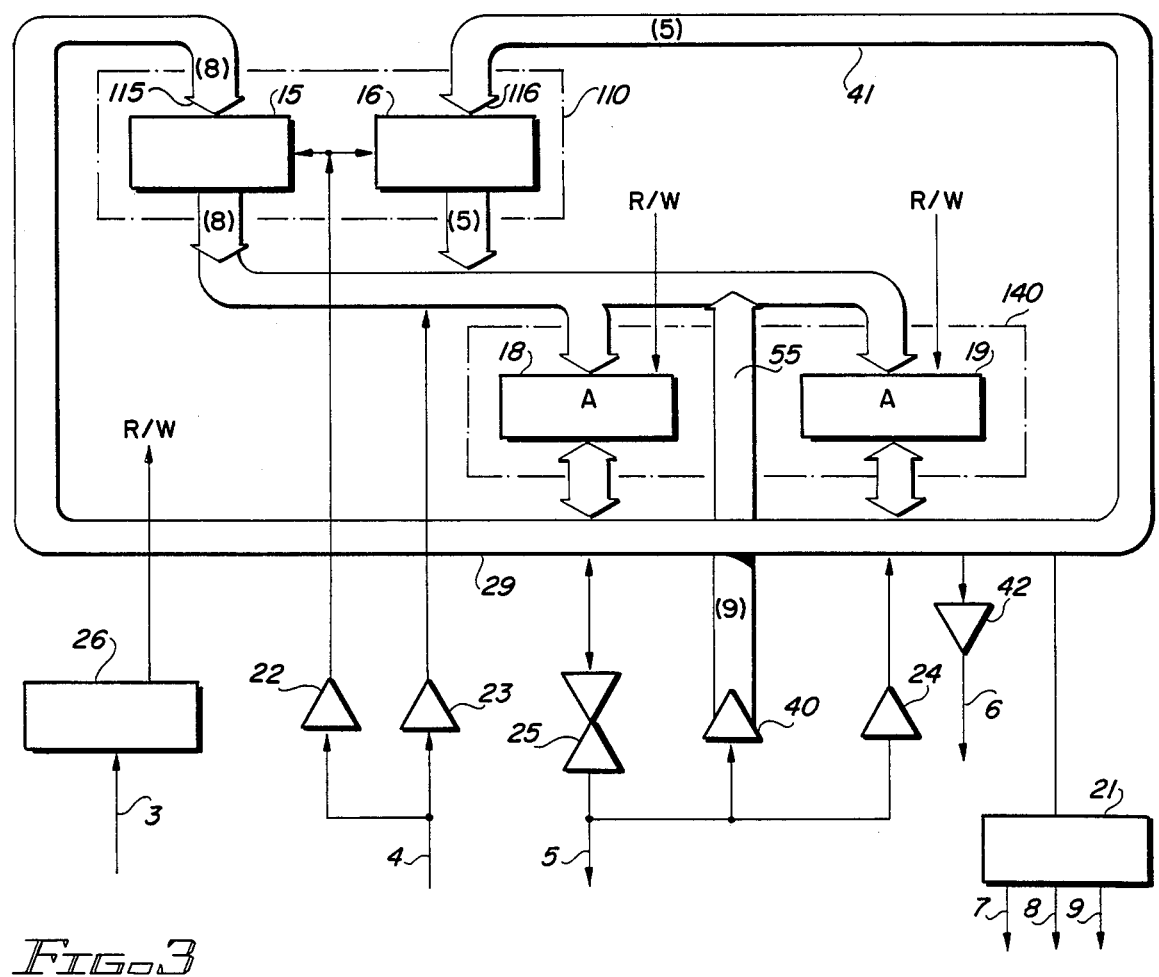
FIG. 3 shows in block diagram a third form of embodiment for a memory system according to the invention.

Referring to FIG. 3, there is shown another alternative embodiment of the invention where all the functions, parity control, SEC-DED code generation, error detection and correction, are performed by a single fast memory.

As referenced above, the fast memory is preferably implemented with integrated circuits HM6788-30 having a capacity of 16K×4 bits. However, in order to relate correct data and error indications to each of the 2 exp 13 input codes each having 13 bits, memories having 8K addressable location suffice. The use of a 16K memory is justified because currently it is among the faster and more reliable ones available on the market. The 8K locations in excess of those effectively needed may therefore be used to perform other functions.

In FIG. 3, fast memory 140 is again implemented with integrated circuits HM6788-30 and the memory system architecture differs from that of FIG. 1 in the following manner:

Channel 5 is connected, through tristate drivers 40 and leads 55, to the address inputs of fast memory 140 which receives on the 14th input a signal R/W generated by the timing and control logic 26. This signal indicates, by its logic level, if the operation to be performed by the memory module is a write or read operation.

Some data outputs of fast memory 140, in number of 5, are connected, through channel 41, to the data inputs 116 of memory section 16 that is to the second subset of the memory module 140 inputs.

One output is connected, through tristate driver 42 to the parity error lead 6.

The operation of the system is very simple. For write operation into module 110, the module is addressed via channel 4, tristate drivers 22 and channel 28. At the same time the data to be written is inputted to section 15, via channel 5, tristates 25 and channel 29. The data to be written is also forwarded, together with the related parity check bit, to the address inputs of fast memory 140, via channel 5 and tristate drivers 40. The R/W signal, indicating a write operation provides a further address bit.

The fast memory operates, as in the case of PROM 17A of FIG. 2, generating a SEC-DED output code related to the received address and a parity error signal if the received data is not consistent with the related parity check bit. The error signal is put on lead 6, via tristate driver 42 and the SEC-DED code is fed as an input to section 16 of memory 110, via channel 41.

For read operations the systems operates identically to the system of FIG. 1.

In FIGS. 1, 2 and 3 references has been made to a memory system having 8 bit parallelism, 8 bits being the minimal addressing unit.

As already mentioned, the memory system may have parallelism greater than 8 bits, for instance 16, 32, 64 bits. In this case the memory system may be conceived as a plurality of memory systems in parallel, each having its related apparatus for parity control, SEC-DED code generation, error detection and correction, each system having 8 bit parallelism.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A Memory System, including error detection and correction means comprising:
   (a) a memory module means, having address inputs and data inputs, for storing at each memory address a first (information) binary code and a second (error detection and correction) binary code related to said information, said first and second binary codes being provided as input to said memory module means, said memory module means further having data outputs to read out from said memory module means at each address a third and fourth binary code, which in absence of a memory error coincide with said first and second binary code, respectively; and
   (b) a fast memory means, having address inputs connected to said data outputs of said memory module means and further having read-out outputs, said fast memory means containing an information set such that for each address defined by said third and fourth binary code there is a corresponding fifth and a sixth binary code output of said read-out outputs provided, said fifth code being coincident with said first code in the absence of a memory error or in the presence of a correctable error, and said sixth code being indicative of the absence of an error, or the presence of a correctable error in said third code, or of the presence of errors which cannot be corrected.

2. A Memory System, according to claim 1, wherein the address inputs of said fast memory means are further connected to an input channel for receiving said first binary code and a parity check bit related to said first binary code, and wherein a subset of said read-out outputs of said fast memory means is connected to a subset of data inputs of said memory module means and a further address input of said fast memory means receives a signal indicative of read/write operation of said memory module means, said fast memory means containing an information set such that for each first binary code received as input at the addressing inputs in conjunction with a control signal indicative of a write operation, said fast memory means provides an output on said read-out outputs providing a second error detection and correction binary code, and a binary signal indicative of parity error/no parity error detected on said first binary code.

3. A memory system, according to claim 1, wherein said data inputs of said memory module means comprise a first and second input subset for respectively receiving said first (information) binary code and said second (error detection and correction) binary code, and further comprising:

(a) a data input channel, connected to said first input subset to provide said first (information) binary code as input to said memory module means; and (b) a second fast memory means, having address inputs connected to said data input channel and data outputs connected to said second input subset, said second fast memory means containing information such that for each first (information) binary code received at the address inputs a second error detection and correction code is outputted.

4. A Memory System, according to claim 3, wherein said second fast memory means includes a second signal output in addition to said data outputs connected to said second subset and a second address input in addition to the address inputs connected to said input channel for receiving a parity check bit related to said first binary code, said second fast memory means containing information such that for each first binary code received at the address inputs provides a binary signal indicative of a parity error as a function of the parity check bit received at said second address input.

* * * * *